United States Patent [19]

McDonald

[11] Patent Number: 4,835,833
[45] Date of Patent: Jun. 6, 1989

[54] METHOD OF MOUNTING A POTENTIOMETER

[75] Inventor: Gerald H. McDonald, Coon Rapids, Minn.

[73] Assignee: Resistance Technology, Inc., Arden Hills, Minn.

[21] Appl. No.: 127,446

[22] Filed: Dec. 2, 1987

[51] Int. Cl.⁴ .............................................. B23P 19/02
[52] U.S. Cl. ........................................ 29/525; 29/432; 29/525.1; 248/27.1; 338/312; 338/332; 338/174; 381/68.6; 381/69
[58] Field of Search ..................... 29/526 R, 432, 525; 174/65 G, 152 G, 153 G; 248/500, 505, 506, 27.1; 338/312, 332, 174; 403/374, 282, 409.1; 381/68.6, 69

[56] References Cited

U.S. PATENT DOCUMENTS

| | | | |
|---|---|---|---|
| 2,519,035 | 8/1950 | Esty | 29/525 X |
| 3,065,004 | 11/1962 | Laich | 29/525 UX |
| 3,067,974 | 12/1962 | Baldwin | 248/27.1 |
| 3,227,992 | 1/1966 | Strong | 174/153 G |
| 3,243,206 | 3/1966 | Samer | 174/65 G X |
| 3,300,163 | 1/1967 | Randolph | 174/65 G X |
| 3,349,649 | 10/1967 | Mele | 29/525 UX |
| 3,399,910 | 9/1968 | Fawkes | 403/282 |
| 3,447,820 | 6/1969 | Durnan | 403/282 X |
| 3,549,828 | 12/1970 | Lang | 248/27.1 X |
| 4,214,793 | 7/1980 | Gargrave | 403/409.1 X |

Primary Examiner—Charlie T. Moon
Attorney, Agent, or Firm—Kinney & Lange

[57] ABSTRACT

A mechanism for a potentiometer, especially a miniature potentiometer used as a volume control in a hearing aid, onto a face plate includes a metallic band circumferentially surrounding a portion of the housing of the potentiometer. The band includes means for mechanically engaging a surface of an aperture in the face plate such that the housing is secured within the aperture. Preferably, the potentiometer also includes a stop means that engages a shoulder or surface of the face plate of the hearing aid positioning the potentiometer within the aperture a selected distance such that the knob of the potentiometer extends beyond a front surface of the face plate.

4 Claims, 2 Drawing Sheets

METHOD OF MOUNTING A POTENTIOMETER

BACKGROUND OF THE INVENTION

1. Field of the Invention.

The present invention relates to mounting potentiometers, and in particular, it relates to mounting a miniature potentiometer onto a face plate of a hearing aid.

2. Description of the Prior Art.

Great efforts have been made to reduce the size of hearing aids. A primary component of a hearing aid is a potentiometer that is used to control volume. The volume control potentiometer has to be easily accessible to the user. For easy access, the volume control potentiometer is mounted on a face plate of the hearing aid. In order for the potentiometer to be mounted on the face plate, the potentiometer has to be quite small, for example, having a diameter of an eighth of an inch (⅛").

The small size of such potentiometers poses problems in terms of costs and manufacturing efficiencies in mounting such potentiometers in hearing aids. Presently, such potentiometers are being adhesively secured within an aperture provided in the face plate of a hearing aid. Although a satisfactory mount results, the adhesive must be given time to cure to a point in which the adhesive starts to hold the potentiometer within the aperture. Prior to such a point, the mounted potentiometer must be handled carefully in order to avoid dislocation of the potentiometer prior to cure.

SUMMARY OF THE INVENTION

The present invention includes a mechanism for and method of mounting a potentiometer, especially a miniature potentiometer into a hearing aid mounting surface.

The mechanism includes a metallic band circumferentially surrounding a portion of the housing of the potentiometer and having means for mechanically engaging a surface of the aperture such that the housing is secured within the aperture. Preferably, the potentiometer also includes a stop means that engages a shoulder or surface of the mounting base of the hearing aid positioning the potentiometer within the aperture a selected distance such that the knob of the potentiometer extends beyond a front surface of the mounting base.

The method includes providing a mounting base having a potentiometer receiving aperture and providing a potentiometer having a circumferentially disposed metal band having means for mechanically engaging a surface of the aperture. Next, the potentiometer is inserted into the aperture, with the means for mechanically engaging, engaging the surface of the aperture and retaining the potentiometer within the aperture.

DETAILED DESCRIPTION OF THE PREFERRED EMBODIMENTS

The present invention includes a mechanism for and method of mounting a miniature potentiometer into a mounting surface of a hearing aid. One example of a miniature potentiometer is described in the Hagen U.S. Pat. No. 4,636,768, assigned to the same assignee as the present application.

Figure 1:
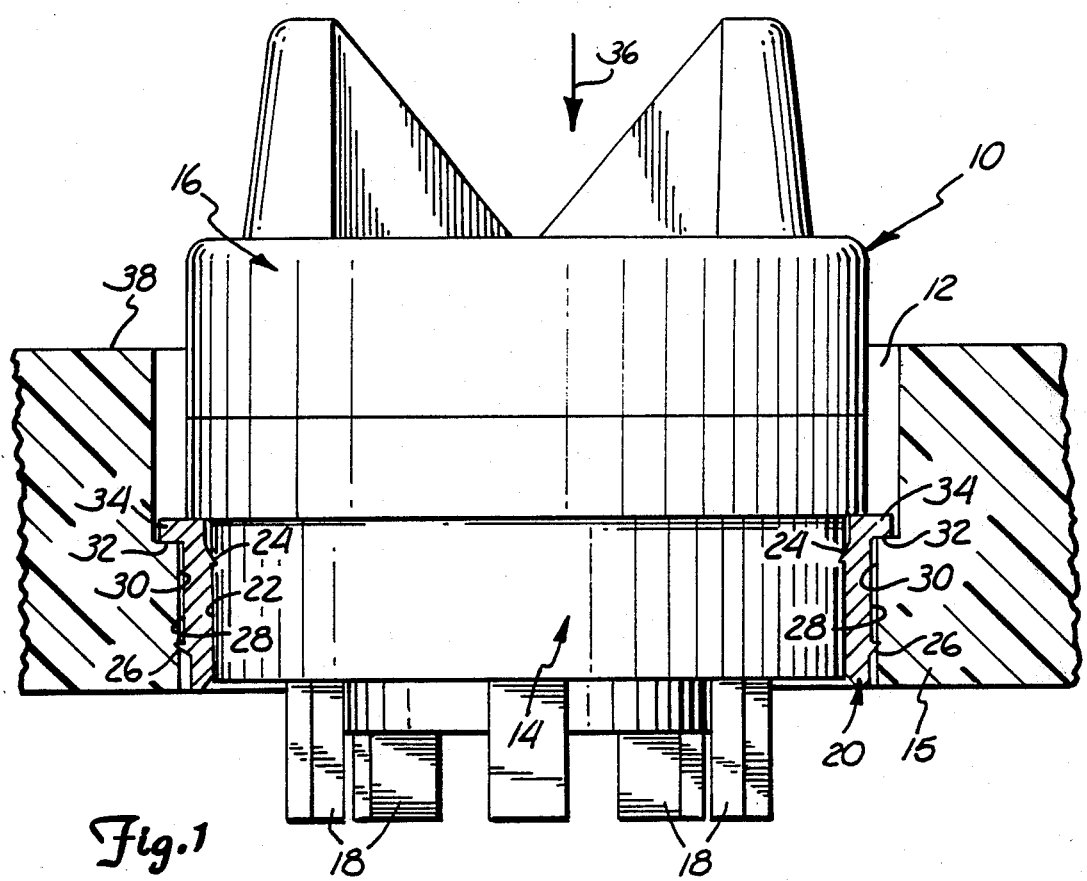
FIG. 1 is an elevational view of a first embodiment of the present invention.

A first embodiment of the present invention is illustrated in FIG. 1. A potentiometer indicated generally at 10 is mounted within an aperture 12 of a face plate 15 of hearing aid (not shown). The face plate of the hearing aid is made of a polymeric material.

The potentiometer 10 includes a rotatable knob member 16 rotatably attached to a housing 14. The housing 14 is made of a non-conductive plastic, such as a glass-filled nylon. A plurality of conductive leads 18 extend from a bottom or rearward side of the potentiometer 10. The various elements within the potentiometer are not shown since they are well known within the art.

A lock ring 20 is press fitted onto an outer surface 22 of the housing 14. The ring 20 is made of metal and is in the form of a band having an inwardly extending projection 24 extending continuously 360° along an inner surface of the band. The projection 24 holds the locking ring 20 such that the locking ring 20 securely to the housing 14, preventing the locking ring 20 from sliding off the housing.

Figure 3:
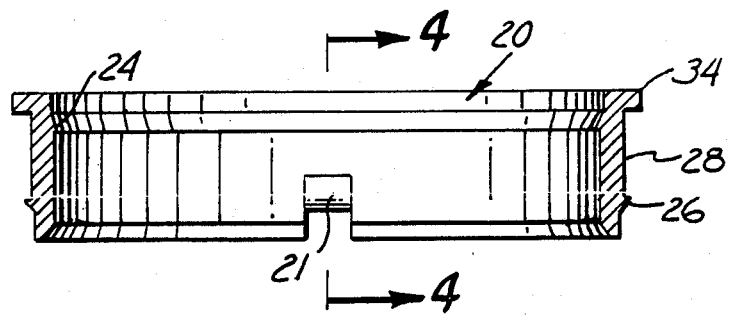
FIG. 3 is a sectional view of the metallic ring of the present invention.
Figure 4:
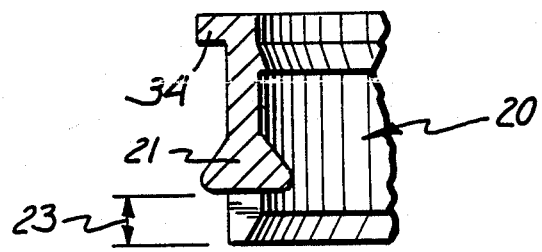
FIG. 4 is a view taken along the line 4—4 in FIG. 3.

Referring to FIGS. 3 and 4, wherein the locking ring 20 is illustrated separately, the locking ring 20 further includes a swaged portion 21. The swaged portion 21 is made prior to the band being positioned over the housing. Once the ring is inserted over the housing 14, the swaged portion 21 prevents rotational movement of the metal band with respect to the housing. Once the potentiometer is mounted on the face plate, the swaged portion prevents rotation with respect to the face plate.

In one working embodiment, the ring 20 has an outside diameter of approximately 0.150 inches and has a height approximately 0.038 inches. The swaged portion is approximately 0.012 inches wide and is swaged approximately 0.008 inches, as indicated by arrow 23 in FIG. 4. The annular flange 34 extends approximately 0.005 inches and is approximately 0.005 inches thick. The wall of the metallic ring is also approximately 0.005 inches thick. The above dimensions are given to convey the miniature size of the ring in the potentiometer of the present invention and are not intended to limit this invention.

Although the locking ring 20 is shown to be mechanically fastened to the housing 14, other methods of fixedly connecting the locking ring 20 to the housing 14 are includable within the scope of the present invention. For example, the housing 14 may be molded in the presence of the locking ring 20 thereby securing the locking ring 20 to the housing 14 by the molding process.

The locking ring 20 further includes an outwardly extending projection 26. The projection 26 is a continuous projection that extends outwardly from an outer surface 28 of the locking ring 20 for 360°. The diameter measured between the outer surfaces of the locking ring is less than the diameter of the adjacent surface 30 of the aperture 12 such that the ring and potentiometer housing are insertable press-fitted into the aperture. However, the projection 26 extends a distance greater than the diameter of the aperture so that the projection 26 engages the surface 30.

In the embodiment illustrated in FIG. 1, the aperture 12 has an annular shoulder 32. The locking ring 20 has an annular lip or flange portion 34 that extends outwardly from the housing 14. The shoulder 32 and the lip portion 34 act as a stopping mechanism that positions the potentiometer within the aperture 12 a selected distance.

In the embodiment illustrated in FIG. 1, the potentiometer 10 is inserted into the aperture in a direction of arrow 36, that is through a front surface 38 of the face plate 15 of the hearing aid. The potentiometer is inserted until the lip portion 34 engages the shoulder 32, the engagement of the lip and shoulder having been selected such that the knob 16 is disposed above the surface 38.

Figure 2:
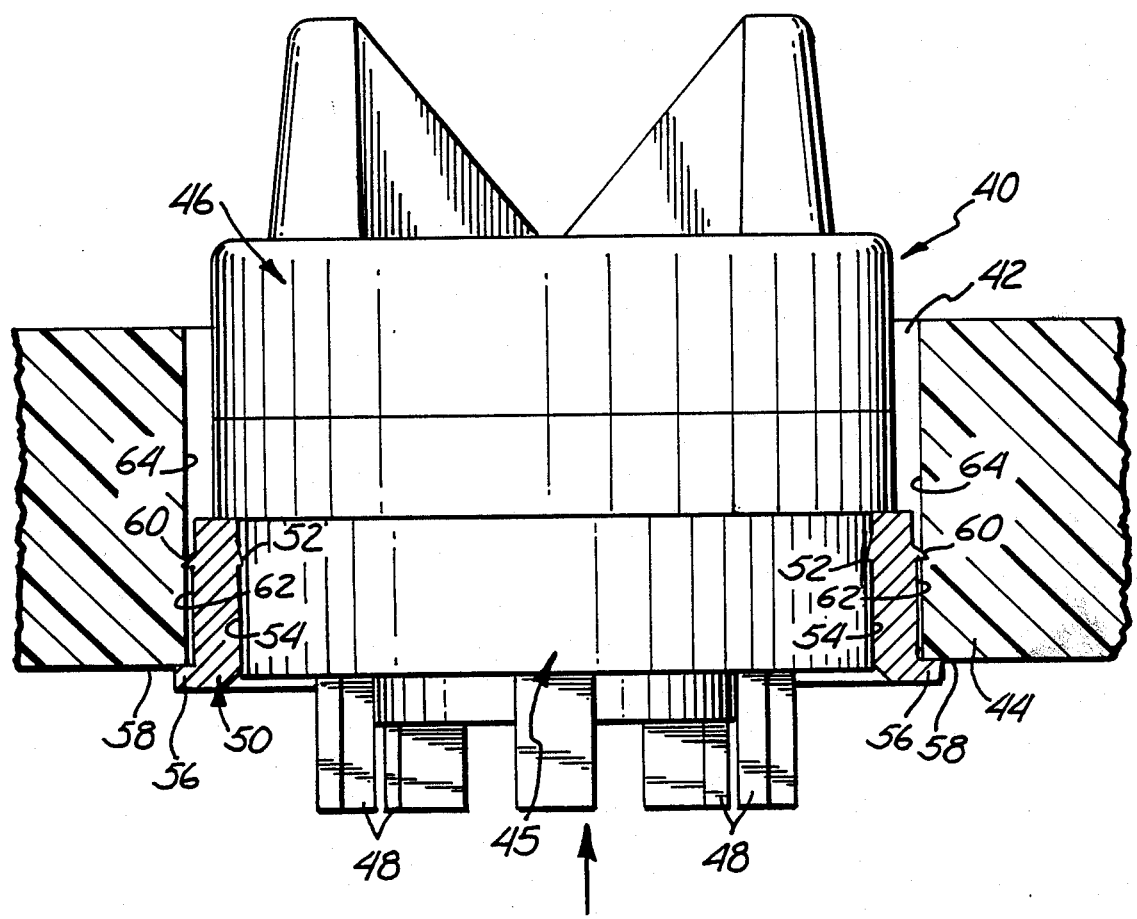
FIG. 2 is an elevational view of a second embodiment of the present invention.

A second embodiment of the present invention is illustrated in FIG. 2. A potentiometer 40, similar in all respects to the potentiometer 40, FIG. 1, is disposed within an aperture 42 of a face plate 44. The potentiometer 40 has a knob 46 rotatably attached to a housing 45. A plurality of leads 48 extend through a back or rearward side of the housing 45.

A metal locking ring 50 is fixedly attached to the housing 45. In the embodiment illustrated in FIG. 2, the locking ring 50 is also a metal band having an inwardly extending projection 52 similar to the projection 24 of the band 20 of FIG. 1 that extends into surface 54 of the housing 45.

The locking ring 50, unlike the locking ring 20, has an annular lip or flange portion 56 extending outwardly therefrom at a lower or rearward end such that the lip portion 56 engages a back surface 58 of the face plate 44.

The locking ring 50 further includes a projection 60 extending outwardly from an outer surface 62 of the ring 50. The projection 60 extends sufficiently to engage an inner surface 64 of the face plate 44.

It will be appreciated, that the embodiment in FIG. 2 is inserted press-fitted into the aperture 42 through a backside of the face plate 44 of the hearing aid. The potentiometer 40 is inserted into the aperture 42 with the projection 60 mechanically engaging the surfaces of the aperture 42. The potentiometer is inserted until the annular lip 56 engages a back surface 58 of the face plate 44. It should be noted that the potentiometer 40 extends sufficiently out of the aperture 42 such that the knob 46 is operable by the user, in the same manner as the potentiometer 10 of FIG. 1.

Although the present invention has been described with reference to preferred embodiments, workers skilled in the art will recognize that changes may be made in form and detail without departing from the spirit and scope of the invention.

What is claimed is:

1. A method of mounting a potentiometer for use in a hearing aid, the method comprising:

providing a hearing aid mounting base having a potentiometer receiving aperture;

providing a potentiometer having a housing with a circumferentially disposed metal band internally secured thereon, said band having external surface means for mechanically engaging a surface of the aperture; and axially press-fitting the potentiometer with the metal band into the aperture such that the external surface means for mechanically engaging the surface of the aperture engages the surface of the aperture securing the potentiometer within the aperture.

2. The method of claim 1 and further including providing means for preventing rotational movement of the housing on the metallic band such that when the potentiometer is positioned into the aperture, the means for preventing rotational movement engages the surface of the aperture.

3. The method of claim 1 wherein the potentiometer is inserted into the aperture until an annular lip extending from said metal band on the potentiometer engages a back surface of the mounting base such that a knob of the potentiometer extends beyond a front surface of the base.

4. The method of claim 1 wherein the aperture has a shoulder and an outwardly extending annular lip of the potentiometer engages said metal band on the shoulder such that a knob of the potentiometer extends beyond a front surface of the base.

* * * * *